United States Patent
Sperling et al.

(10) Patent No.: US 12,336,647 B2
(45) Date of Patent: Jun. 24, 2025

(54) COUNTER FOR SERVING CONSUMABLE ITEMS TO PETS

(71) Applicant: The Pet Parents Store LLC, Ankeny, IA (US)

(72) Inventors: Mikaela Sperling, Ankeny, IA (US); Blake Anderssen, Ankeny, IA (US)

(73) Assignee: The Pet Parents Store LLC, Ankeny, IA (US)

( * ) Notice: Subject to any disclaimer, the term of this patent is extended or adjusted under 35 U.S.C. 154(b) by 0 days.

(21) Appl. No.: 18/321,029

(22) Filed: May 22, 2023

(65) Prior Publication Data

US 2023/0371715 A1    Nov. 23, 2023

Related U.S. Application Data

(60) Provisional application No. 63/365,132, filed on May 22, 2022.

(51) Int. Cl.
*A47F 9/00* (2006.01)
*A01K 5/01* (2006.01)
*A47F 5/00* (2006.01)

(52) U.S. Cl.
CPC .............. *A47F 9/00* (2013.01); *A01K 5/0114* (2013.01); *A47F 5/0018* (2013.01)

(58) Field of Classification Search
CPC ......... A01K 5/0114; A01K 39/01; A47F 9/00; A47F 5/0018; A47F 9/005; A47F 3/02; A47F 10/02
USPC ........................................................ 119/521
See application file for complete search history.

(56) References Cited

U.S. PATENT DOCUMENTS

| | | | | |
|---|---|---|---|---|
| 1,339,652 A | * | 5/1920 | Humpherys | A47F 9/00 312/118 |
| 1,361,562 A | * | 12/1920 | Bekkering | A47F 9/00 312/107 |
| 2,138,560 A | * | 11/1938 | Stuart | A21B 1/50 D7/610 |
| 2,478,247 A | * | 8/1949 | Conley | A47B 95/02 220/318 |

(Continued)

FOREIGN PATENT DOCUMENTS

| | | |
|---|---|---|
| CN | 302111762 | 3/2018 |
| CN | 304532924 | 5/2019 |

(Continued)

*Primary Examiner* — Timothy D Collins
*Assistant Examiner* — Maria E Graber
(74) *Attorney, Agent, or Firm* — Robinson IP Law, PLLC

(57) ABSTRACT

The system includes a countertop portion, a barrier section, and one or more trays. The countertop portion has a front side and a back side. The barrier section is coupled to a bottom side of the countertop portion along the front side of the countertop. The barrier section is configured to support the countertop portion in use. The barrier section defines one or more openings therethrough. Each tray is aligned with one of the one or more openings and slidable relative to the barrier section between a retracted position and an extended position. Each of the trays is closer to the back side of the countertop in the extended position than it is in the retracted position. Each of the trays passes at least partially through its respective opening when sliding between the retracted position and the extended position.

15 Claims, 6 Drawing Sheets

(56) References Cited

U.S. PATENT DOCUMENTS

| | | | | |
|---|---|---|---|---|
| 2,489,493 | A | * | 11/1949 | Kuenzie ............... A47B 87/002 312/107 |
| 2,659,345 | A | * | 11/1953 | Herbert ................. A01K 1/035 119/61.5 |
| 2,790,694 | A | * | 4/1957 | Palmer ...................... A47F 9/00 312/140.3 |
| 3,122,265 | A | * | 2/1964 | Innis ................. B65D 81/3834 220/23.6 |
| 3,169,810 | A | * | 2/1965 | Levy ......................... A47F 9/00 312/265.5 |
| 4,041,277 | A | * | 8/1977 | Shumrak .............. H05B 1/0252 219/403 |
| 4,194,109 | A | * | 3/1980 | Springer ............... A47J 39/006 99/347 |
| 5,191,747 | A | * | 3/1993 | Tengquist ................. E06B 7/32 52/27 |
| 5,709,165 | A | * | 1/1998 | Nurmikko ............ A01K 15/025 119/51.01 |
| D403,889 | S | | 1/1999 | Geier et al. |
| D403,890 | S | | 1/1999 | Geier et al. |
| 6,547,084 | B2 | * | 4/2003 | Bauman ................ A47F 5/0018 312/138.1 |
| D490,625 | S | | 6/2004 | Trazzi |
| D521,277 | S | | 5/2006 | Quintal |
| D560,099 | S | * | 1/2008 | Hatcher ..................... D7/554.3 |
| D587,938 | S | | 3/2009 | Hartsfield, Jr. |
| 7,665,417 | B1 | * | 2/2010 | Harper ................. A01K 5/0135 119/61.5 |
| D661,950 | S | * | 6/2012 | Greenwood ................ D7/600.1 |
| D764,845 | S | | 8/2016 | Tsuchiyama et al. |
| D781,088 | S | | 3/2017 | Knoll et al. |
| D782,231 | S | | 3/2017 | Illy et al. |
| 10,477,984 | B2 | * | 11/2019 | Arnold ................... A47B 96/04 |
| D891,163 | S | | 7/2020 | Laitila et al. |
| 10,993,527 | B2 | * | 5/2021 | Wiener ................. A47B 21/02 |
| D937,614 | S | | 12/2021 | Dejesus |
| D950,992 | S | | 5/2022 | Schafer et al. |
| 11,666,033 | B2 | * | 6/2023 | Kamaleddine ....... A01K 5/0114 119/51.01 |
| 2007/0028854 | A1 | * | 2/2007 | Chern ................. A01K 5/0114 119/753 |
| 2011/0154638 | A1 | * | 6/2011 | Calzada ................ A47J 39/006 29/592 |
| 2017/0208940 | A1 | * | 7/2017 | Boudreault ............... A47F 3/02 |

FOREIGN PATENT DOCUMENTS

| | | |
|---|---|---|
| CN | 305169313 | 6/2019 |
| CN | 305840724 | 11/2019 |
| CN | 305192316 | 6/2020 |

* cited by examiner

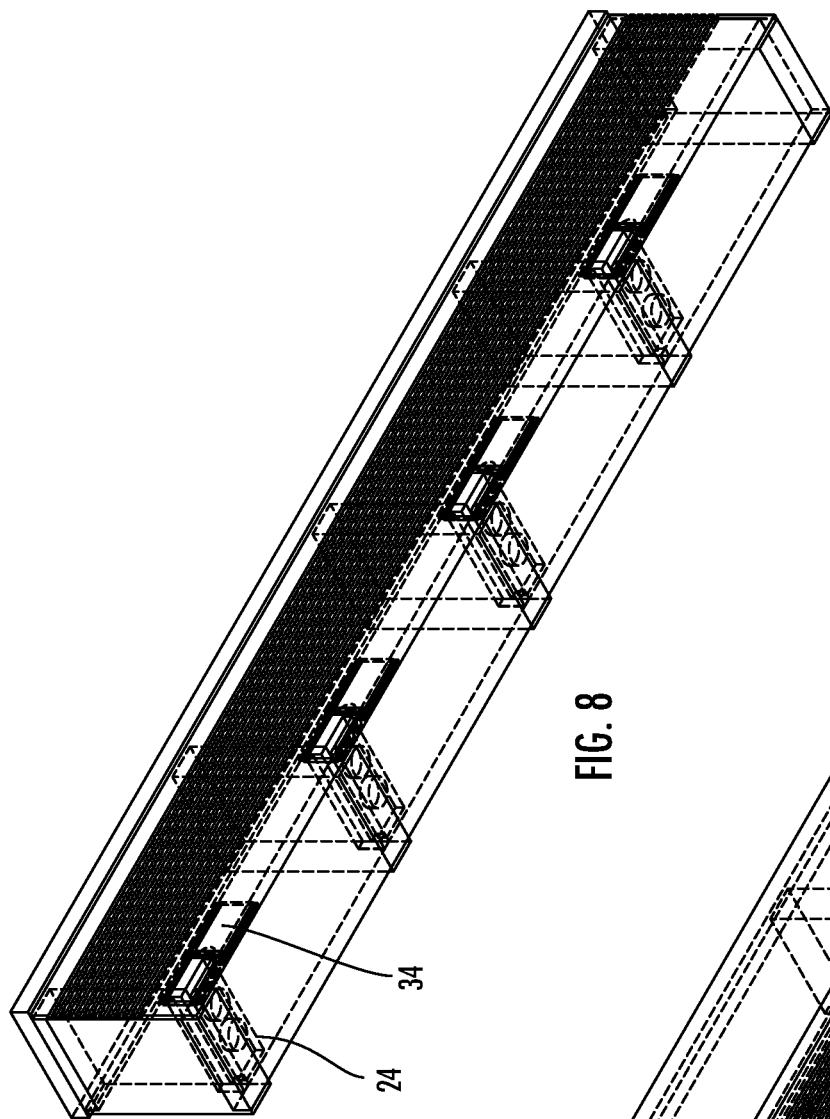
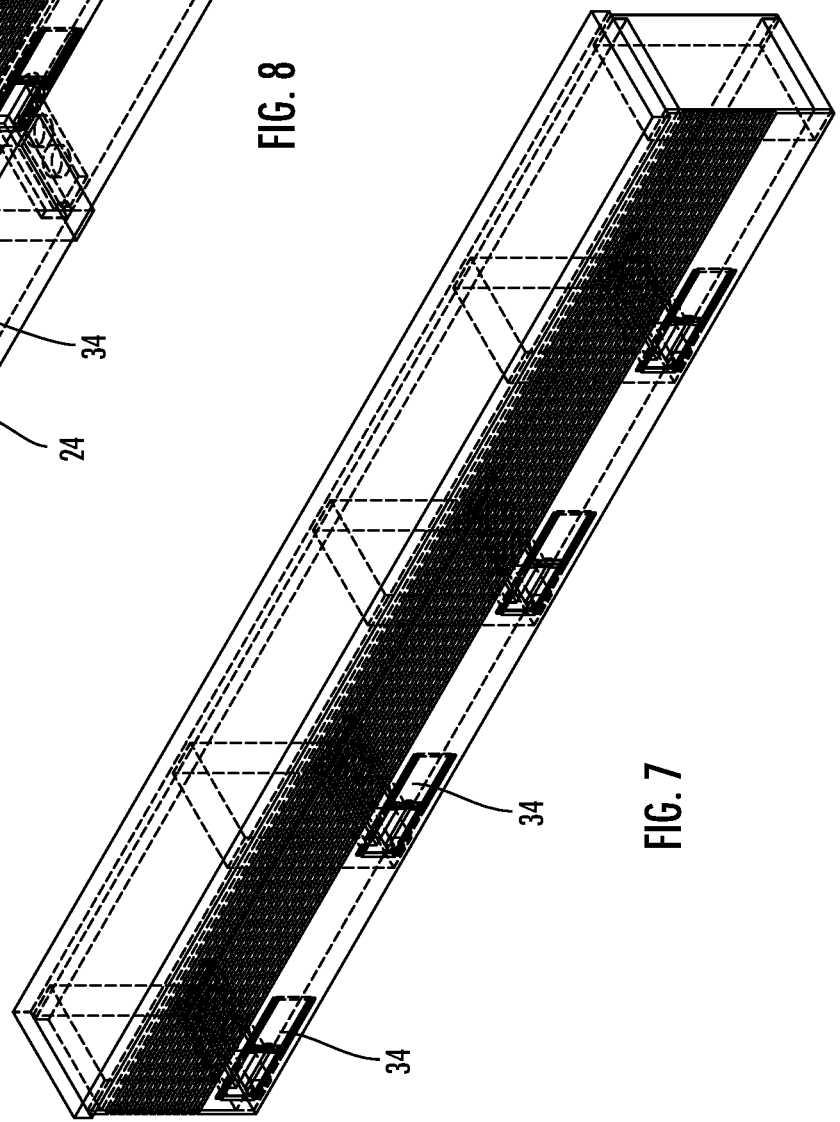

COUNTER FOR SERVING CONSUMABLE ITEMS TO PETS

FIELD

This disclosure relates to the field of retail store products. More particularly, this disclosure relates to a counter for serving food or other consumable items to animals.

BACKGROUND

Pet retail stores commonly include food, treats, and other items that are for sale that may be consumed by pets. In selecting a consumable item that may be desirable for the pet, it may be necessary to allow the pet to sample the consumable item at the pet retail store to ensure that the pet will consume the item.

Existing pet retail store concepts do not adequately provide a means for allowing safe consumption of an item by a pet in the retail store. For example, an owner of a pet may be required to purchase various food or treat items in the pet retail store before allowing the pet to consume those items. Some pet retail stores include samples that may be located near a checkout counter of the pet retail store, such as on the checkout counter. However, samples are either provided directly to the pet by an employee of the pet retail store or by an owner of the pet.

These existing arrangements within pet retail stores do not provide for meaningful interaction between employees of the pet retail store and owners of pets while allowing pets to sample a consumable item within the pet retail store. Where an employee of a pet retail store may have knowledge and be able to offer advice regarding a suitable food or other consumable item for the pet. Additional problems may exist with allowing an employee of the pet retail store to directly provide consumable items to a pet, such as an owner of a pet being uncertain as to the product that is being given to the pet or interaction of the employee directly with the pet. Risks may also arise with respect to employees of the pet retail store interacting with a pet directly, such as the risk of biting, scratching, or other injuries that may be caused to the employee by the pet. Other risks to the pet may exist, such as pets fighting over a food item when two or more pets are present during consumption of food or a treat in the pet store.

Current and existing arrangements also do not provide for an environment wherein a pet may consume an item without being fed the item from the hands of an employee or pet owner or from on the ground instead of in a food bowl. Because a pet may normally consume food from a bowl, when the pet is provided food or a treat from a person's hand or the ground it may be difficult to discern whether the pet is interested in the food or treat itself and not simply consuming an item that is handed to them or dropped on the ground. Also if food is placed on the floor of a store, this may cause an unsafe environment based on lack of food containment or competition between animals, and it may cause illness in the pet from any contamination on the floor.

SUMMARY

Various implementations include a counter system. The system includes a countertop portion, a barrier section, and one or more trays. The countertop portion has a front side and a back side. The barrier section is coupled to a bottom side of the countertop portion along the front side of the countertop. The barrier section is configured to support the countertop portion in use. The barrier section defines one or more openings therethrough. Each tray is aligned with one of the one or more openings and slidable relative to the barrier section between a retracted position and an extended position. Each of the trays is closer to the back side of the countertop in the extended position than it is in the retracted position. Each of the trays passes at least partially through its respective opening when sliding between the retracted position and the extended position.

In some implementations, each of the trays defines at least one tray cutout extending therethrough and configured to receive a food receptacle. In some implementations, the at least one tray cutout is circular. In some implementations, the at least one tray cutout includes two tray cutouts.

In some implementations, each of the trays includes at least one bowl coupled directly to the tray.

In some implementations, the system further includes one or more upright portions coupled to a bottom side of the countertop portion and extending transverse to the barrier section. In some implementations, the one or more trays include a first tray and a second tray. In some implementations, the countertop portion, barrier section, and one or more upright portions define a first pet area and a second pet area visually separated from the first pet area. In some implementations, the first tray is disposed within the first pet area when in the extended position, and the second tray is disposed within the second pet area when in the extended position.

In some implementations, each of the one or more trays is slidingly coupled to one of the one or more upright portions. In some implementations, each of the one or more upright portions defines a slot extending toward the barrier section. In some implementations, each of the one or more trays is slidingly coupled to the slot. In some implementations, the slot is a T-slot. In some implementations, each of the one or more trays includes a vertical portion having a thickness greater than the thickness of the remaining portion of the trey. In some implementations, the vertical portion of each of the one or more trays is slidingly disposed within a separate T-slot.

In some implementations, the system further includes one or more doors each configured to movably cover one of the one or more openings. In some implementations, the one or more doors are each configured to slidingly cover one of the one or more openings. In some implementations, each of the one or more doors includes a handle, indention, or opening.

In some implementations, each of the one or more trays is configured to be from 0 to 12 inches from an end of the barrier opposite the countertop portion.

In some implementations, the height of the countertop portion as measured from the bottom of the countertop portion to an end of the barrier opposite the countertop portion is 24 inches to 48 inches.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 7 shows a front perspective cross-sectional view of a counter having one or more doors; and FIG. 8 shows a rear perspective cross-sectional view of a counter having one or more doors.

DETAILED DESCRIPTION

The devices, systems, and methods disclosed herein provide for a counter or other display to be arranged in a retail pet store that allows for consumable items to be provided to a pet in the pet retail store. The devices, systems, and methods disclosed herein provide for a safe environment for the pet while reducing the risk of any injury to employees of the pet retail store or to the pets themselves in providing samples of consumable items to pets. The devices, systems, and methods disclosed herein allow a pet to consume an item and determining whether the pet prefers the item before being purchased by an owner of the pet.

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Various implementations include a counter system. The system includes a countertop portion, a barrier section, and one or more trays. The countertop portion has a front side and a back side. The barrier section is coupled to a bottom side of the countertop portion along the front side of the countertop. The barrier section is configured to support the countertop portion in use. The barrier section defines one or more openings therethrough. Each tray is aligned with one of the one or more openings and slidable relative to the barrier section between a retracted position and an extended position. Each of the trays is closer to the back side of the countertop in the extended position than it is in the retracted position. Each of the trays passes at least partially through its respective opening when sliding between the retracted position and the extended position.

Figure 1:
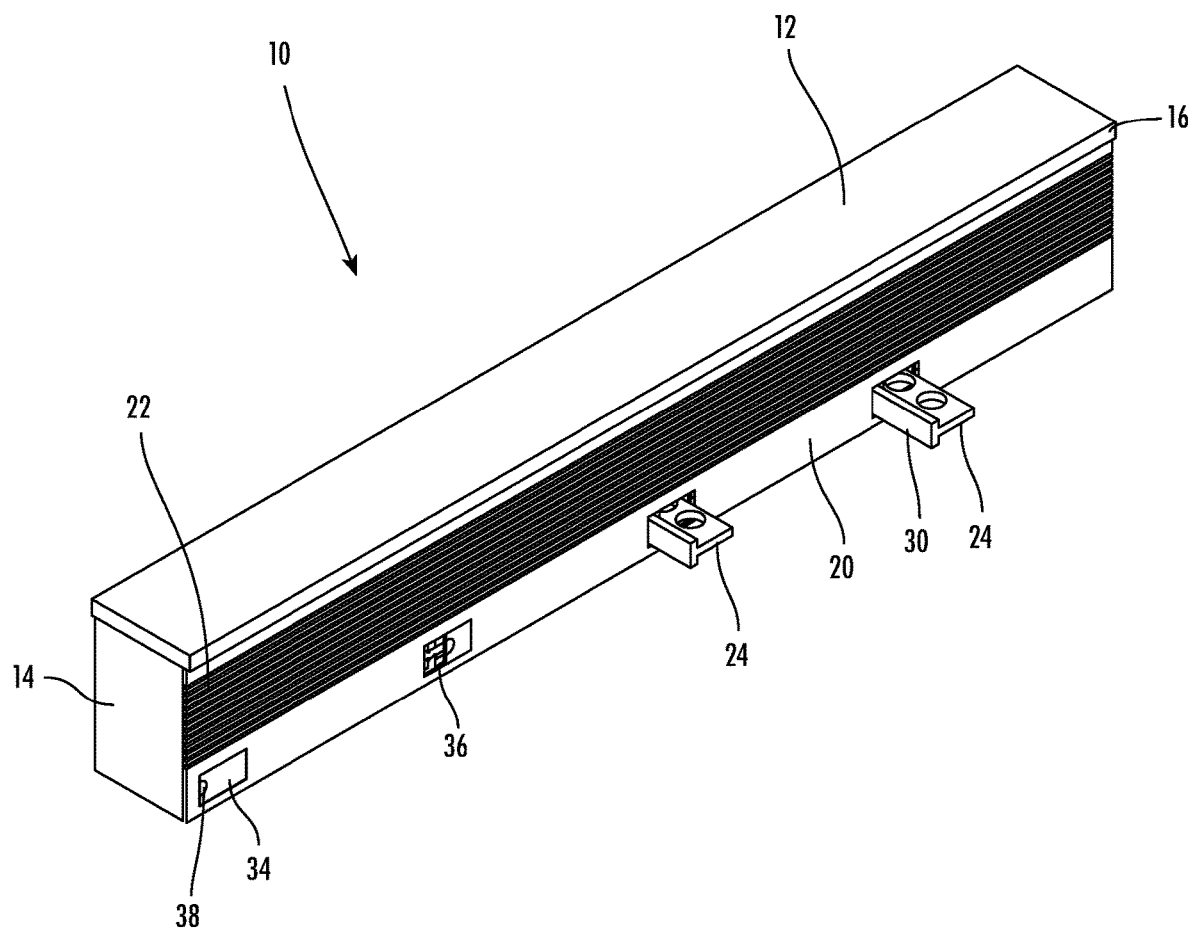
FIG. 1 shows a perspective front view of a counter having one or more extendable trays.

FIG. 1 shows a counter 10 for use in a pet retail store. The counter 10 may be located in an area of a pet retail store, such as near food or treats within the pet retail store that are available for purchase. The counter 10 may be configured to provide access to samples of consumable items in the pet retail store without requiring an employee of the pet retail store to interact directly with the pet.

The counter 10 may include a countertop portion 12 that is located on an upper portion of the counter 10. The countertop portion 12 may form a substantially planar surface on which items may be placed. The countertop portion 12 may be located at a height that is suitable for use by an employee of a pet retail store and an owner of a pet. For example, a height of the countertop portion may vary from about 24 inches to about 48 inches. A height of the countertop portion 12 may be approximately 36 inches above a floor surface on which the counter 10 is located. A height of the countertop portion 12 may vary. The countertop portion 12 may be higher, such as approximately 42 inches above a floor surface on which the counter 10 is located, such as when stools or other chairs are used. The countertop portion 12 may have a lower height such that the countertop portion 12 is accessible to those who may require a lower surface on the countertop portion 12.

Figure 2:
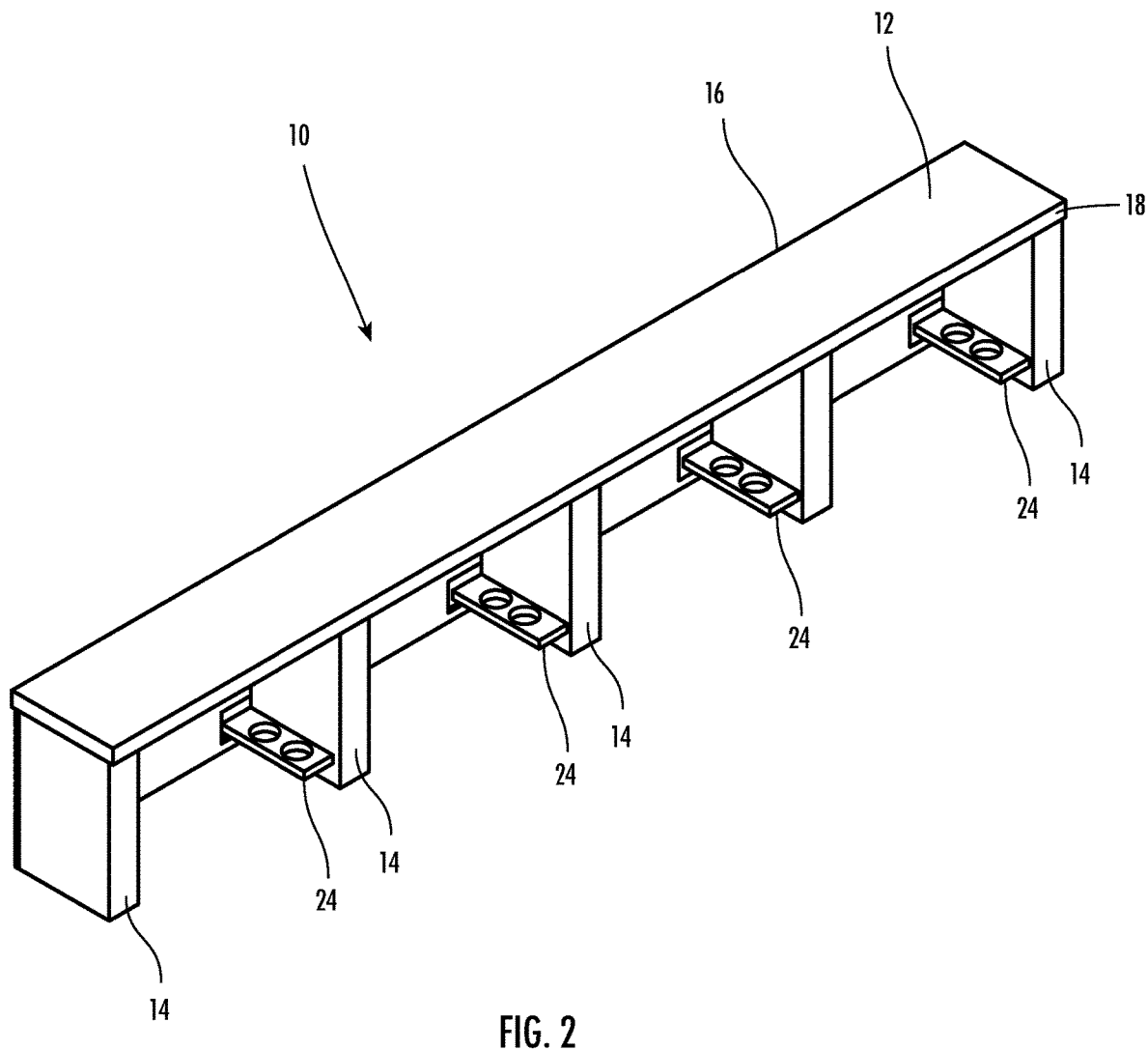
FIG. 2 shows a perspective rear view of a counter having one or more extendable trays.
Figure 3:
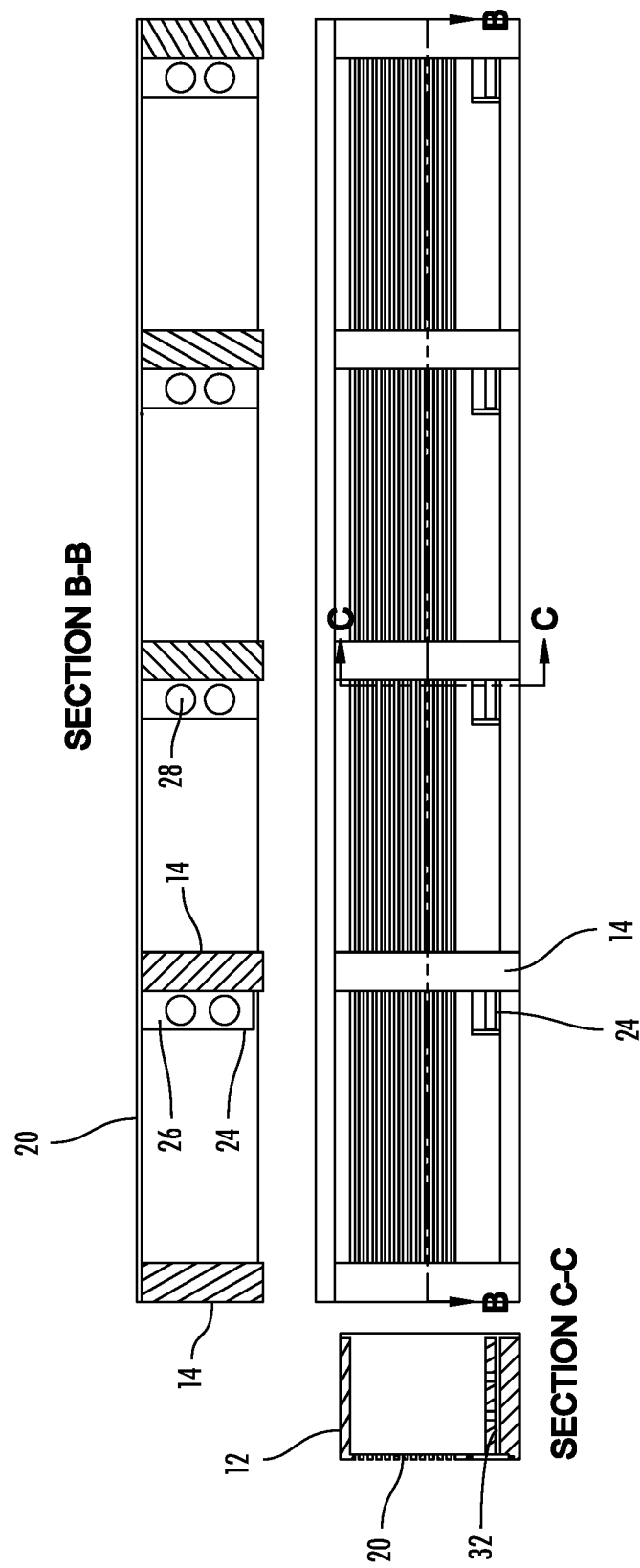
FIG. 3 shows section views of a counter.

Referring to FIG. 2, the counter 10 may further include a plurality of upright portions 14 located underneath the countertop portion 12. The plurality of upright portions 14 may extend from a front 16 of the countertop portion 12 that is facing an employee of a pet retail store to a back 18 of the countertop portion 12 that is facing a pet and an owner of the pet and may support the countertop portion 12 on top of the plurality of upright portions 14. The plurality of upright portions 14 may be located along a length of the countertop portion 12, as shown in FIG. 3. For example, one or more of the plurality of upright portions 14 may be located towards ends of the countertop portion 12, while other of the plurality of upright portions 14 may be located between ends of the countertop portion 12.

Referring again to FIG. 1, the counter 10 further includes a barrier section 20 located along a front side of the counter 10. The barrier section 20 may extend from the countertop portion 12 down to a floor surface on which the counter 10 is located such that the barrier section 20 forms a barrier between an employee of the pet store located on a first side of the counter 10 and a pet and an owner of the pet located on a second side of the counter 10. The barrier section 20 may be substantially flat and may include one or more decorative elements 22 located across the barrier section 20. The barrier section 20 may be substantially solid or may include one or more vents formed through the barrier section 20.

With further reference to FIG. 1, the counter 10 includes one or more trays 24 that are movably mounted to the counter 10. The one or more trays 24 are movably mounted to the counter 10 such that the one or more trays 24 may move between a position in which the one or more trays 24 are located beyond the barrier section 20 of the counter such that the one or more trays are accessible to a pet and a position in which the one or more trays 24 are retracted behind the barrier section 20 of the counter towards an employee standing behind the counter 10. The one or more trays 24 include a tray body 26 as shown in FIG. 3. The tray body 26 may include one or more tray cutouts 28 formed through the tray. The one or more tray cutouts 28 may be circular in shape and may be sized to receive a pet food bowl therein as discussed in greater detail below. The tray body 26 may include a pair of tray cutouts 28 formed through the one or more trays 24. Although the figures show the tray cutouts 28 being circular in shape, it is understood that a shape of the tray cutouts 28 may vary. Alternatively, one or more bowls may be formed directly on the one or more trays 24 for holding food, treats, or other consumable items for a pet.

Figure 4:
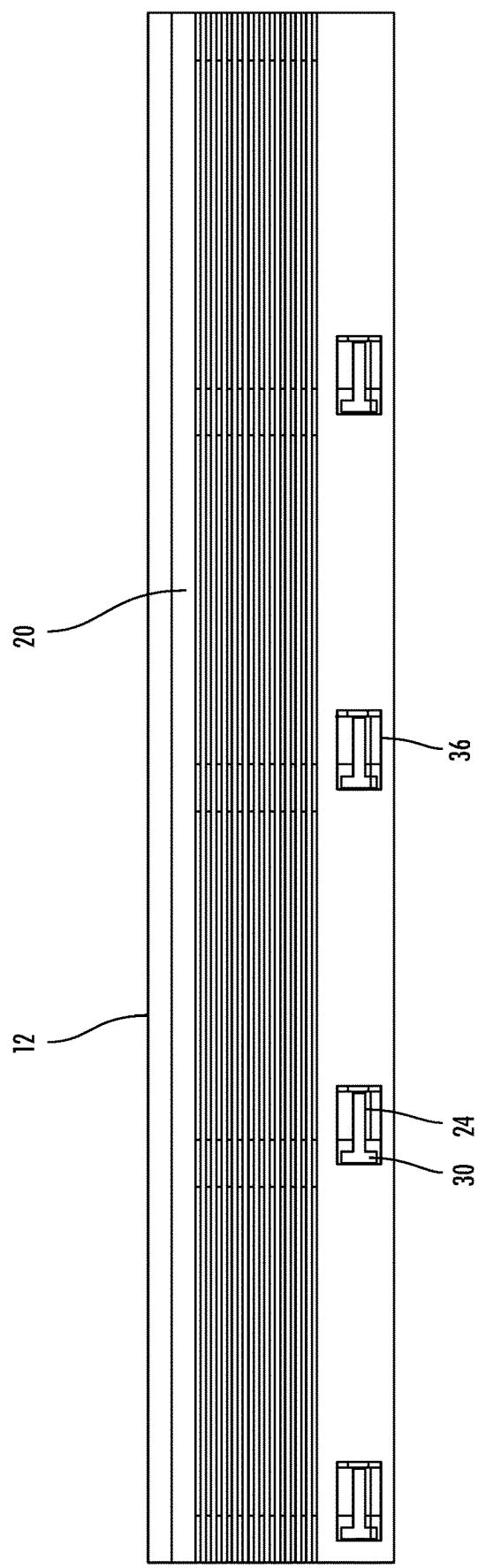
FIG. 4 shows a front elevational view of a counter.
Figure 5:
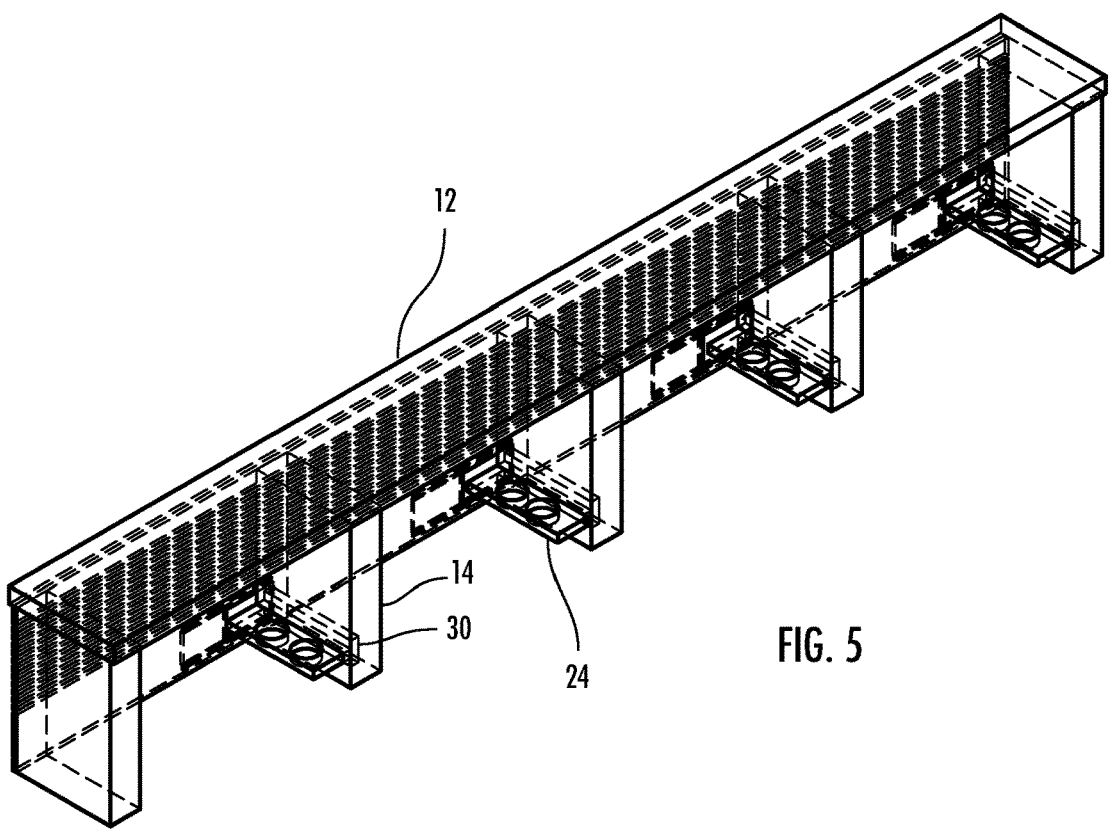
FIG. 5 shows a front perspective cross-sectional view of a counter.
Figure 6:
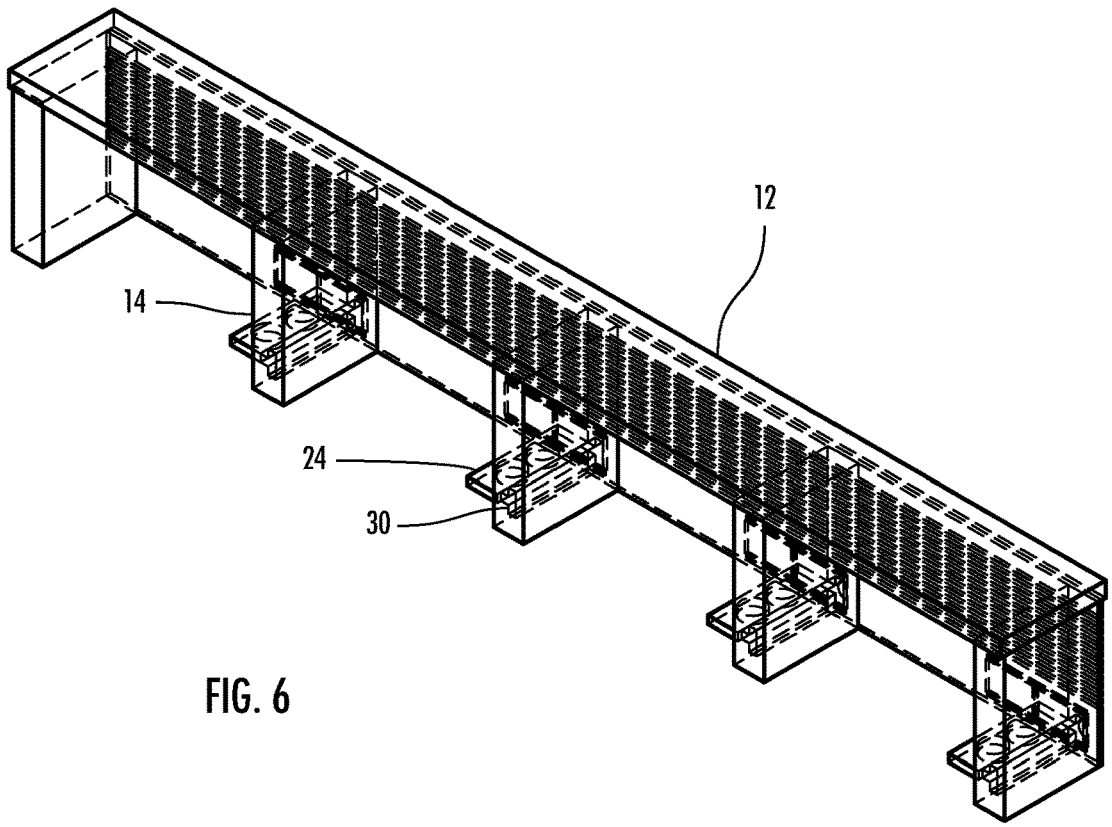
FIG. 6 shows a rear perspective cross-sectional view of a counter.

Referring to FIG. 4, the one or more trays 24 may further include a vertical portion 30 extending along lengths of the one or more trays 24 such that the one or more trays 24 have a T-shaped profile substantially along a length of the one or more trays 24. The vertical portion 30 of the one or more trays 24 may be shaped to fit within at least a portion of the plurality of upright portions 14 such that the one or more trays 24 may be supported on and slide relative to the plurality of upright portions 14 (FIG. 5 and FIG. 6). As shown in FIG. 3, the plurality of upright portions 14 may include a slot 32 formed along lengths of the plurality of upright portions 14 such that a portion of the tray 24 may extend through the slot 32. For example, the tray body 26 may be located through the slot 32 of the plurality of upright portions 14. At least a portion of an interior of the plurality of upright portions 14 may be at least partially hollow such that the plurality of upright portions 14 may act as guides for the one or more trays 24 sliding thereon.

The one or more trays 24 are configured to slide between a retracted position and an extended position, as shown in FIG. 1. The counter 10 includes one or more doors 34 movably located on the barrier section 20 of the counter 10. The one or more doors 34 are located on the barrier section 20 such that when the one or more doors 34 are in a closed position, the one or more doors 34 at least partially conceal one or more openings 36 formed in the barrier section 20 of the counter 10 through which the one or more trays 24 may slide through when the one or more trays 24 are in extended positions. The one or more doors 34 may be slidably mounted on the barrier section 20 of the counter 10, as shown in FIG. 7 and FIG. 8.

In open positions, the one or more doors 34 may slide into the barrier section 20 of the counter 10, such as into cavities formed in the barrier section 20 adjacent to the one or more doors 34. The one or more doors 34 may be otherwise mounted on the counter 10 such that the one or more doors 34 are capable of moving between open and closed positions. For example, the one or more doors 34 may be hingedly mounted on the barrier section 20 of the counter 10 such that the one or more doors 34 hinge between open and closed positions. The one or more doors 34 may further include an indentation 38 (FIG. 1), handle, or similar structure located on the one or more doors 34 that allow a user to move the one or more doors 34 between open and closed positions.

The one or more trays 24 are located on the counter 10 such that the one or more trays 24 are proximate to a floor surface under the counter 10 to allow a pet to access the one or more trays 24 when the one or more trays 24 are in extended positions from the counter 10. For example, the one or more trays 24 may be located from about 0 inches to about 12 inches from a floor surface underneath the counter 10 to allow various sizes of pets to consume food or treats located on the one or more trays 24. The one or more trays 24 are supported above a floor surface such that a pet may sample items placed on the one or more trays 24 when the one or more trays 24 are in extended positions from the counter 10.

In operation, such as in a pet store, a pet owner and a pet may approach the counter 10 towards the back 18 of the countertop portion 12. The pet may fit under the countertop portion 12 into an area defined between two of the plurality of upright portions 14 such that the pet may be substantially separated from other pets that may be located at the counter 10. An employee or other individual may be located towards the front of the countertop portion 12 and on a side of the barrier section 20 that is separate from the pet located at least partially underneath the counter 10. The employee may engage the pet owner to discuss characteristics or traits of the pet to determine one or more consumable items that may be appropriate for the pet. The employee may subsequently engage the indentation 38 or other handle located on one of the one or more doors 34 located proximate to the pet to open the door 34. The employee may withdraw one of the one or more trays 24 from the area proximate to the pet and towards the employee such that the employee may place one or more consumable items on one of the one or more trays 24. Alternatively, the one or more trays 24 may be initially located towards the employee behind the barrier section 20 to allow the employee to place consumable items thereon. The employee may subsequently push the one or more trays 24 towards the pet within the area located under the countertop portion 12 and close the one or more doors 34 such that the one or more trays 24 containing consumable items are available to the pet for consumption.

Although the above describes an arrangement wherein the one or more trays 24 may slide from a first side of the counter 10 to a second side of the counter 10 to allow an employee to add food or other items to be provided to a pet, it is also understood that an arrangement of the counter may vary. The one or more doors 34 may be openable without requiring sliding of the trays 24 and may provide access for an employee to place one or more consumable items into the one or more trays 24 for consumption by a pet. Further, other various means may be suitable for moving the trays from a first side of the counter 10 to a second side thereof.

The counter 10 disclosed herein advantageously allows for consumable items to be placed in the one or more trays 24 and provided to a pet without requiring an employee to directly interact with a pet. Further, a pet owner may interact directly with an employee of a pet retail store while the pet samples consumable items placed on the one or more trays 24. A pet is able to consume items on the one or more trays 24 without distraction and while reducing any risk to the pet and employees of a pet retail store. The barrier portion 20 prevents interaction between an employee of the pet store and the pet to minimize any risks associated with either an employee or a pet. Further, the plurality of upright portions 14 allow multiple pets to interact with consumable items at the counter 10 while preventing the multiple pets from interacting with one another or fighting over food while sampling a consumable item. The arrangement of the counter 10 further allows for meaningful interaction between an employee and a pet owner while minimizing distractions to a pet when sampling consumable items.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A counter system, the system comprising:
a countertop portion having a front side and a back side;
a barrier section coupled to a bottom side of the countertop portion along the front side of the countertop, the barrier section having a bottom end opposite and spaced apart from the countertop portion, the barrier section being configured to support the countertop portion in use, wherein the barrier section defines one or more openings therethrough, wherein the barrier section includes one or more doors each movably coupled to the barrier section, each of the one or more doors being movable between a closed position and an open position, wherein each of the one or more doors at least partially covers a different one of the one or more openings in the closed position, wherein the different one of the one or more openings is uncovered when the one or more doors are in the open position; and one or more trays, each tray being aligned with one of the one or more openings and slidable relative to the barrier section between a retracted position and an extended position wherein the one or more trays are closer to the bottom side of the barrier section than they are to the countertop portion, wherein each of the trays is closer to the back side of the countertop in the extended position than it is in the retracted position, wherein the tray is accessible from the back side of the countertop when in the extended position, and wherein each of the trays passes at least partially through its respective opening when sliding between the retracted position and the extended position, wherein the tray is accessible from the front side of the countertop when in the retracted position.

2. The system of claim 1, wherein each of the trays includes at least one bowl coupled directly to the tray.

3. The system of claim 1, wherein the one or more doors are each configured to slidingly cover one of the one or more openings.

4. The system of claim 1, wherein each of the one or more doors includes a handle, indention, or opening.

5. The system of claim 1, wherein each of the one or more trays is configured to be from 0 to 12 inches from the bottom end of the barrier opposite the countertop portion.

6. The system of claim 1, wherein the height of the countertop portion as measured from the bottom of the countertop portion to an end of the barrier opposite the countertop portion is 24 inches to 48 inches.

7. The system of claim 1, wherein each of the trays defines at least one tray cutout extending therethrough and configured to receive a food receptacle.

8. The system of claim 7, wherein the at least one tray cutout is circular.

9. The system of claim 7, wherein the at least one tray cutout comprises two tray cutouts.

10. The system of claim 1, further comprising one or more upright portions coupled to a bottom side of the countertop portion and extending transverse to the barrier section.

11. The system of claim 10, wherein the one or more trays comprises a first tray and a second tray, wherein the countertop portion, barrier section, and one or more upright portions define a first pet area and a second pet area visually separated from the first pet area, wherein the first tray is disposed within the first pet area when in the extended position and the second tray is disposed within the second pet area when in the extended position.

12. The system of claim 10, wherein each of the one or more trays is slidingly coupled to one of the one or more upright portions.

13. The system of claim 12, wherein each of the one or more upright portions defines a slot extending toward the barrier section, wherein each of the one or more trays is slidingly coupled to the slot.

14. The system of claim 13, wherein the slot is a T-slot.

15. The system of claim 14, wherein each of the one or more trays includes a horizontal portion and a vertical portion having a thickness greater than the thickness of the horizontal portion of the tray, wherein the vertical portion of each of the one or more trays is slidingly disposed within a separate T-slot.

* * * * *